United States Patent
Yum et al.

(10) Patent No.: US 9,605,914 B2
(45) Date of Patent: Mar. 28, 2017

(54) BATTERY SYSTEM AND METHOD OF ASSEMBLING THE BATTERY SYSTEM

(71) Applicant: LG Chem, Ltd., Seoul (KR)

(72) Inventors: Juil Yum, Ann Arbor, MI (US); Satish Ketkar, Troy, MI (US)

(73) Assignee: LG Chem, Ltd., Seoul (KR)

( * ) Notice: Subject to any disclaimer, the term of this patent is extended or adjusted under 35 U.S.C. 154(b) by 16 days.

(21) Appl. No.: 14/328,000

(22) Filed: Jul. 10, 2014

(65) Prior Publication Data

US 2014/0322572 A1    Oct. 30, 2014

Related U.S. Application Data

(63) Continuation-in-part of application No. 13/433,649, filed on Mar. 29, 2012, now Pat. No. 9,105,950.

(51) Int. Cl.
| | |
|---|---|
| *F28C 1/00* | (2006.01) |
| *F28F 21/06* | (2006.01) |
| *H01M 10/6569* | (2014.01) |
| *H01M 10/6551* | (2014.01) |
| *H01M 10/613* | (2014.01) |

(Continued)

(52) U.S. Cl.
CPC ............ *F28F 21/06* (2013.01); *H01M 10/613* (2015.04); *H01M 10/6551* (2015.04); *H01M 10/6569* (2015.04); *B60H 1/00278* (2013.01); *F25B 39/022* (2013.01); *F28D 2021/0028* (2013.01); *Y10T 29/49108* (2015.01)

(58) Field of Classification Search
CPC .............. B60H 1/00278; F25B 39/022; H01M 10/613; H01M 10/6551
See application file for complete search history.

(56) References Cited

U.S. PATENT DOCUMENTS

| | | | |
|---|---|---|---|
| 1,587,425 | A | 6/1926 | Otto |
| 2,273,244 | A | 2/1942 | Cornelius |

(Continued)

FOREIGN PATENT DOCUMENTS

| | | |
|---|---|---|
| CN | 201859929 U | 6/2011 |
| CN | 102396098 B | 4/2014 |

(Continued)

OTHER PUBLICATIONS

International Search Report for International application No. PCT/KR2013/004015 dated Sep. 26, 2013.

(Continued)

*Primary Examiner* — David Teitelbaum

(74) *Attorney, Agent, or Firm* — Buckert Patent & Trademark Law Firm, PC; John F. Buckert

(57) ABSTRACT

A battery system is provided. The battery system includes a cooling plate having a housing, an inlet port, and an outlet port. The housing defines an interior region. Both the inlet port and the outlet port fluidly communicate with the interior region. The battery system further includes a solid thermoplastic cooling fin having first and second panel portions. The first panel portion is disposed directly on and against the cooling plate. The battery system further includes a first battery cell disposed directly on and against a first side of the second panel portion of the solid thermoplastic cooling fin. The solid thermoplastic cooling fin is configured to conduct heat energy from the first battery cell to the cooling plate.

13 Claims, 10 Drawing Sheets

(51) Int. Cl.
　　　B60H 1/00　　　(2006.01)
　　　F25B 39/02　　　(2006.01)
　　　F28D 21/00　　　(2006.01)

(56) References Cited

U.S. PATENT DOCUMENTS

| | | |
|---|---|---|
| 2,391,859 A | 1/1946 | Babcock |
| 3,503,558 A | 3/1970 | Galiulo et al. |
| 3,522,100 A | 7/1970 | Lindstrom |
| 3,550,681 A | 12/1970 | Stier et al. |
| 3,964,930 A | 6/1976 | Reiser |
| 4,009,752 A | 3/1977 | Wilson |
| 4,063,590 A | 12/1977 | McConnell |
| 4,298,904 A | 11/1981 | Koenig |
| 4,305,456 A | 12/1981 | Mueller et al. |
| 4,322,776 A | 3/1982 | Job et al. |
| 4,444,994 A | 4/1984 | Baker et al. |
| 4,518,663 A | 5/1985 | Kodali et al. |
| 4,646,202 A | 2/1987 | Hook et al. |
| 4,701,829 A | 10/1987 | Bricaud et al. |
| 4,777,561 A | 10/1988 | Murphy et al. |
| 4,849,858 A | 7/1989 | Grapes et al. |
| 4,982,785 A | 1/1991 | Tomlinson |
| 4,995,240 A | 2/1991 | Barthel et al. |
| 5,057,968 A | 10/1991 | Morrison |
| 5,071,652 A | 12/1991 | Jones et al. |
| 5,186,250 A | 2/1993 | Ouchi et al. |
| 5,214,564 A | 5/1993 | Metzler et al. |
| 5,270,131 A | 12/1993 | Diethelm et al. |
| 5,322,745 A | 6/1994 | Yanagihara et al. |
| 5,329,988 A | 7/1994 | Juger |
| 5,346,786 A | 9/1994 | Hodgetts |
| 5,356,735 A | 10/1994 | Meadows et al. |
| 5,392,873 A | 2/1995 | Masuyama et al. |
| 5,443,926 A | 8/1995 | Holland et al. |
| 5,510,203 A | 4/1996 | Hamada et al. |
| 5,520,976 A | 5/1996 | Giannetti et al. |
| 5,663,007 A | 9/1997 | Ikoma et al. |
| 5,736,836 A | 4/1998 | Hasegawa et al. |
| 5,756,227 A | 5/1998 | Suzuki et al. |
| 5,937,664 A | 8/1999 | Matsuno et al. |
| 5,985,483 A | 11/1999 | Verhoog et al. |
| 6,087,036 A | 7/2000 | Rouillard et al. |
| 6,111,387 A | 8/2000 | Kouzu et al. |
| 6,159,630 A | 12/2000 | Wyser |
| 6,176,095 B1 | 1/2001 | Porter |
| 6,289,979 B1 | 9/2001 | Kato |
| 6,344,728 B1 | 2/2002 | Kouzu et al. |
| 6,362,598 B2 | 3/2002 | Laig-Horstebrock et al. |
| 6,399,238 B1 | 6/2002 | Oweis et al. |
| 6,422,027 B1 | 7/2002 | Coates, Jr. et al. |
| 6,448,741 B1 | 9/2002 | Inui et al. |
| 6,462,949 B1 | 10/2002 | Parish, IV et al. |
| 6,512,347 B1 | 1/2003 | Hellmann et al. |
| 6,569,556 B2 | 5/2003 | Zhou et al. |
| 6,662,891 B2 | 12/2003 | Misu et al. |
| 6,689,510 B1 | 2/2004 | Gow et al. |
| 6,696,197 B2 | 2/2004 | Inagaki et al. |
| 6,724,172 B2 | 4/2004 | Koo |
| 6,750,630 B2 | 6/2004 | Inoue et al. |
| 6,775,998 B2 | 8/2004 | Yuasa et al. |
| 6,780,538 B2 | 8/2004 | Hamada et al. |
| 6,821,671 B2 | 11/2004 | Hinton et al. |
| 6,826,948 B1 | 12/2004 | Bhatti et al. |
| 6,878,485 B2 | 4/2005 | Ovshinsky et al. |
| 6,982,131 B1 | 1/2006 | Hamada et al. |
| 7,070,874 B2 | 7/2006 | Blanchet et al. |
| 7,143,724 B2 | 12/2006 | Hashizumi et al. |
| 7,150,935 B2 | 12/2006 | Hamada et al. |
| 7,250,741 B2 | 7/2007 | Koo et al. |
| 7,264,902 B2 | 9/2007 | Horie et al. |
| 7,278,389 B2 | 10/2007 | Kirakosyan |
| 7,467,525 B1 | 12/2008 | Ohta et al. |
| 7,531,270 B2 | 5/2009 | Buck et al. |
| 7,591,303 B2 | 9/2009 | Zeigler et al. |
| 7,795,845 B2 | 9/2010 | Cho |
| 7,797,958 B2 | 9/2010 | Alston et al. |
| 7,816,029 B2 | 10/2010 | Takamatsu et al. |
| 7,846,573 B2 | 12/2010 | Kelly |
| 7,879,480 B2 | 2/2011 | Yoon et al. |
| 7,883,793 B2 | 2/2011 | Niedzwiecki et al. |
| 7,976,978 B2 | 7/2011 | Shin et al. |
| 7,981,538 B2 | 7/2011 | Kim et al. |
| 7,997,367 B2 | 8/2011 | Nakamura |
| 8,007,915 B2 | 8/2011 | Kurachi |
| 8,011,467 B2 | 9/2011 | Asao et al. |
| 8,030,886 B2 | 10/2011 | Mahalingam et al. |
| 8,067,111 B2 | 11/2011 | Koetting et al. |
| 8,209,991 B2 | 7/2012 | Kondou et al. |
| 8,409,743 B2 | 4/2013 | Okada et al. |
| 8,663,829 B2 | 3/2014 | Koetting et al. |
| 2002/0086201 A1 | 7/2002 | Payen et al. |
| 2002/0182493 A1 | 12/2002 | Ovshinsky et al. |
| 2003/0080714 A1 | 5/2003 | Inoue et al. |
| 2003/0189104 A1 | 10/2003 | Watanabe et al. |
| 2003/0211384 A1 | 11/2003 | Hamada et al. |
| 2004/0069474 A1 | 4/2004 | Wu et al. |
| 2005/0026014 A1 | 2/2005 | Fogaing et al. |
| 2005/0089750 A1 | 4/2005 | Ng et al. |
| 2005/0103486 A1 | 5/2005 | Demuth et al. |
| 2005/0110460 A1 | 5/2005 | Arai et al. |
| 2005/0134038 A1 | 6/2005 | Walsh |
| 2006/0234119 A1 | 10/2006 | Kruger et al. |
| 2006/0286450 A1 | 12/2006 | Yoon et al. |
| 2007/0062681 A1 | 3/2007 | Beech |
| 2007/0087266 A1 | 4/2007 | Bourke et al. |
| 2007/0227166 A1 | 10/2007 | Rafalovich et al. |
| 2008/0003491 A1 | 1/2008 | Yahnker et al. |
| 2008/0041079 A1 | 2/2008 | Nishijima et al. |
| 2008/0090137 A1* | 4/2008 | Buck ............... H01M 2/1077 429/120 |
| 2008/0110189 A1 | 5/2008 | Alston et al. |
| 2008/0182151 A1 | 7/2008 | Mizusaki et al. |
| 2008/0248338 A1 | 10/2008 | Yano et al. |
| 2008/0299446 A1 | 12/2008 | Kelly |
| 2008/0314071 A1 | 12/2008 | Ohta et al. |
| 2009/0074478 A1 | 3/2009 | Kurachi |
| 2009/0087727 A1 | 4/2009 | Harada et al. |
| 2009/0104512 A1 | 4/2009 | Fassnacht et al. |
| 2009/0123819 A1 | 5/2009 | Kim |
| 2009/0155680 A1 | 6/2009 | Maguire et al. |
| 2009/0186265 A1 | 7/2009 | Koetting et al. |
| 2009/0258288 A1 | 10/2009 | Weber et al. |
| 2009/0258289 A1 | 10/2009 | Weber et al. |
| 2009/0280395 A1 | 11/2009 | Nemesh et al. |
| 2009/0325051 A1 | 12/2009 | Niedzwiecki et al. |
| 2009/0325052 A1 | 12/2009 | Koetting et al. |
| 2009/0325054 A1 | 12/2009 | Payne et al. |
| 2009/0325055 A1 | 12/2009 | Koetting et al. |
| 2010/0112419 A1 | 5/2010 | Jang et al. |
| 2010/0203376 A1 | 8/2010 | Choi et al. |
| 2010/0209760 A1 | 8/2010 | Yoshihara et al. |
| 2010/0262791 A1 | 10/2010 | Gilton |
| 2010/0275619 A1 | 11/2010 | Koetting et al. |
| 2010/0276132 A1 | 11/2010 | Payne |
| 2010/0279152 A1 | 11/2010 | Payne |
| 2010/0279154 A1 | 11/2010 | Koetting et al. |
| 2010/0304203 A1 | 12/2010 | Buck et al. |
| 2010/0307723 A1 | 12/2010 | Thomas et al. |
| 2011/0000241 A1 | 1/2011 | Favaretto |
| 2011/0020676 A1 | 1/2011 | Kurosawa |
| 2011/0027631 A1 | 2/2011 | Koenigsmann |
| 2011/0027640 A1 | 2/2011 | Gadawski et al. |
| 2011/0041525 A1 | 2/2011 | Kim et al. |
| 2011/0045326 A1 | 2/2011 | Leuthner et al. |
| 2011/0052959 A1 | 3/2011 | Koetting et al. |
| 2011/0052960 A1 | 3/2011 | Kwon et al. |
| 2011/0189523 A1 | 8/2011 | Eom |
| 2011/0293982 A1 | 12/2011 | Martz et al. |
| 2011/0293983 A1 | 12/2011 | Oury et al. |
| 2012/0082880 A1 | 4/2012 | Koetting et al. |
| 2012/0171543 A1 | 7/2012 | Hirsch et al. |
| 2012/0183830 A1 | 7/2012 | Schaefer et al. |
| 2013/0045410 A1 | 2/2013 | Yang et al. |

(56) References Cited

U.S. PATENT DOCUMENTS

| | | |
|---|---|---|
| 2013/0136136 A1 | 5/2013 | Ando et al. |
| 2013/0255293 A1 | 10/2013 | Gadawski et al. |
| 2013/0309542 A1 | 11/2013 | Merriman et al. |
| 2014/0050953 A1 | 2/2014 | Yoon et al. |
| 2014/0050966 A1 | 2/2014 | Merriman et al. |
| 2014/0120390 A1 | 5/2014 | Merriman et al. |
| 2014/0147709 A1 | 5/2014 | Ketkar et al. |
| 2014/0227575 A1 | 8/2014 | Ketkar |
| 2014/0308558 A1 | 10/2014 | Merriman et al. |
| 2015/0010801 A1 | 1/2015 | Arena et al. |

FOREIGN PATENT DOCUMENTS

| | | |
|---|---|---|
| DE | 19639115 A | 3/1998 |
| DE | 102008034860 A1 | 1/2010 |
| DE | 102009006426 A1 | 7/2010 |
| EP | 1577966 A | 9/2005 |
| EP | 1852925 A | 11/2007 |
| EP | 2065963 A2 | 6/2009 |
| EP | 2200109 A2 | 6/2010 |
| EP | 2262048 A | 12/2010 |
| GB | 481891 A | 3/1938 |
| JP | 08111244 A | 4/1996 |
| JP | H09129213 A | 5/1997 |
| JP | H09219213 A | 8/1997 |
| JP | 2001023703 | 1/2001 |
| JP | 2001105843 A | 4/2001 |
| JP | 2002038033 A | 2/2002 |
| JP | 2002319383 A | 10/2002 |
| JP | 2002333255 A | 11/2002 |
| JP | 2003188323 A | 7/2003 |
| JP | 2003282112 A | 10/2003 |
| JP | 2004333115 A | 11/2004 |
| JP | 2005126315 A | 5/2005 |
| JP | 2005147443 A | 6/2005 |
| JP | 2005349955 A | 12/2005 |
| JP | 2006139928 A | 6/2006 |
| JP | 2007305425 A | 11/2007 |
| JP | 2008054379 A | 3/2008 |
| JP | 2008062875 A | 3/2008 |
| JP | 2008080995 A | 4/2008 |
| JP | 2008159440 A | 7/2008 |
| JP | 2009009889 A | 1/2009 |
| JP | 2009054297 A | 3/2009 |
| JP | 2009238644 | 10/2009 |
| JP | 2012015096 | 10/2009 |
| JP | 2012018915 | 1/2012 |
| KR | 20050092605 A | 9/2005 |
| KR | 100637472 B1 | 10/2006 |
| KR | 100765659 B1 | 10/2007 |
| KR | 20080047641 A | 5/2008 |
| KR | 20090082212 A | 7/2009 |
| KR | 100921346 B1 | 10/2009 |
| KR | 20090107443 A | 10/2009 |
| KR | 20100119497 A | 9/2010 |
| KR | 20100119498 A | 9/2010 |
| KR | 1020100119497 A | 11/2010 |
| KR | 1020100119498 A | 11/2010 |
| KR | 1020110013269 A | 2/2011 |
| KR | 1020110013270 A | 2/2011 |
| KR | 20110013269 A | 9/2011 |
| KR | 20110126764 A | 11/2011 |
| WO | 2006101343 A | 9/2006 |
| WO | 2007007503 A | 1/2007 |
| WO | 2007115743 A2 | 10/2007 |
| WO | 2008111162 A | 9/2008 |
| WO | 2009073225 A | 6/2009 |
| WO | 2011145830 A2 | 11/2011 |

OTHER PUBLICATIONS

Written Opinion for International application No. PCT/KR2013002597 dated Feb. 2, 2015.

Written Opinion for International application No. PCT/KR2014/002090 dated May 26, 2014.

"Gasket". Merriam-Webster. Merriam-Webster. Web. May 30, 2012. <http://www.merriam-webster.com/dictionary/gasket>.

International Search Report; International Application No. PCT/KR2009/000258; International Filing Date: Jan. 16, 2009; Date of Mailing: Aug. 28, 2009; 2 pages.

International Search Report; International Application No. PCT/KR2009/003428, International Filing Date: Jun. 25, 2009; Date of Mailing: Jan. 22, 2010; 2 pages.

International Search Report; International Application No. PCT/KR2009/003429; International Filing Date: Jun. 25, 2009; Date of Mailing: Jan. 12, 2010; 3 pages.

International Search Report; International Application No. PCT/KR2009/003430; International Filing Date: Jun. 25, 2009; Date of Mailing: Feb. 3, 2010; 2 pages.

International Search Report; International Application No. PCT/KR2009/003434; International Filing Date: Jun. 25, 2009; Date of Mailing: Jan. 18, 2010; 2 pages.

International Search Report; International Application No. PCT/KR2009/003436; International Filing Date: Jun. 25, 2009; Date of Mailing: Jan. 22, 2010; 2 pages.

International Search Report; International Application No. PCT/KR2009/006121; International Filing Date: Oct. 22, 2009; Date of Mailing: May 3, 2010; 2 pages.

International Search Report; International Application No. PCT/KR2010/002334; International Filing Date: Apr. 15, 2010; Date of Mailing: Nov. 29, 2010; 2 pages.

International Search Report; International Application No. PCT/KR2010/002336; International Filing Date: Apr. 15, 2010; Date of Mailing: Jan. 31, 2011; 2 pages.

International Search Report; International Application No. PCT/KR2010/002337; International Filing Date: Apr. 15, 2010; Date of Mailing: May 3, 2010; 2 pages.

International Search Report; International Application No. PCT/KR2010/002340; International Filing Date: Apr. 15, 2010; Date of Mailing: Jan. 31, 2011; 2 pages.

International Search Report; International Application No. PCT/KR2010/004944; International Filing Date: Jul. 28, 2010; Date of Mailing: Apr. 29, 2011; 2 pages.

International Search Report; International Application No. PCT/KR2010/005639; International Filing Date: Aug. 24, 2010; Date of Mailing: Jun. 3, 2011; 2 pages.

\* cited by examiner

BATTERY SYSTEM AND METHOD OF ASSEMBLING THE BATTERY SYSTEM

CROSS-REFERENCE TO RELATED APPLICATIONS

This application is a continuation-in-part of U.S. patent application Ser. No. 13/433,649 filed on Mar. 29, 2012, the entire contents of which are hereby incorporated by reference herein.

BACKGROUND

The inventors herein have recognized a need for an improved battery system and a method of assembling the improved battery system.

SUMMARY

A battery system in accordance with an exemplary embodiment is provided. The battery system includes a cooling plate having a housing, an inlet port, and an outlet port. The housing defines an interior region. Both the inlet port and the outlet port fluidly communicate with the interior region. The battery system further includes a solid thermoplastic cooling fin having first and second panel portions. The first panel portion is disposed directly on and against the cooling plate. The battery system further includes a first battery cell disposed directly on and against a first side of the second panel portion of the solid thermoplastic cooling fin. The solid thermoplastic cooling fin is configured to conduct heat energy from the first battery cell to the cooling plate.

A method of assembling a battery system in accordance with another exemplary embodiment is provided. The method includes providing a cooling plate having a housing, an inlet port, and an outlet port. The housing defines an interior region. Both the inlet port and the outlet port fluidly communicate with the interior region. The method further includes providing a solid thermoplastic cooling fin having first and second panel portions. The method further includes providing first and second battery cells. The method further includes disposing the first panel portion of the solid thermoplastic cooling fin directly on and against the cooling plate. The method further includes disposing the first battery cell directly on and against a first side of the second panel portion of the solid thermoplastic cooling fin. The method further includes disposing the second battery cell directly on and against a second side of the second panel portion of the solid thermoplastic cooling fin.

DETAILED DESCRIPTION

Figure 1:
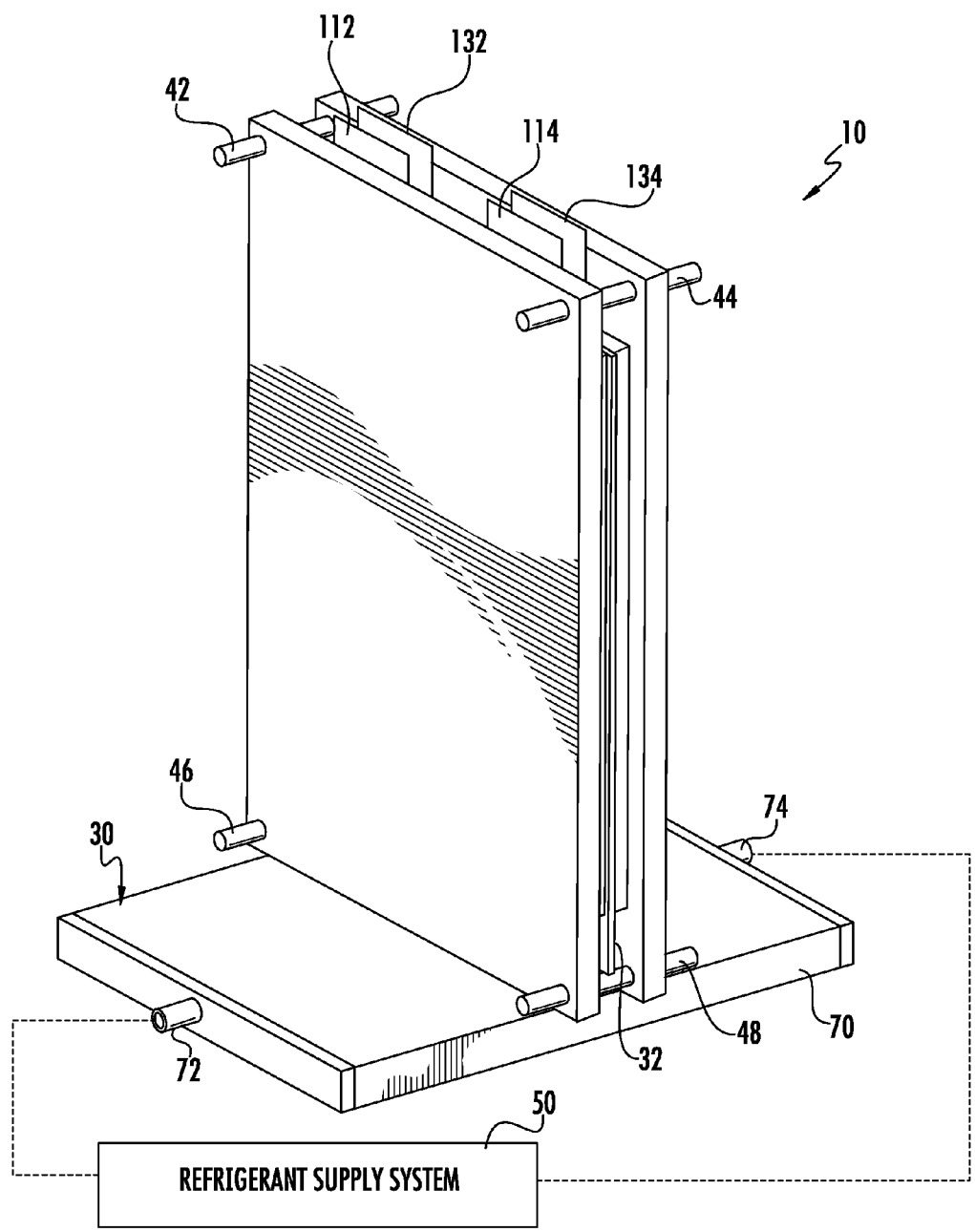
FIG. 1 is a schematic of a battery system in accordance with an exemplary embodiment.

Referring to FIGS. 1-9, a battery system 10 in accordance with an exemplary embodiment is provided. The battery system 10 includes a cooling plate 30, a solid thermoplastic cooling fin 32, a first battery cell 34, a second battery cell 36, a first plastic frame member 38, a second plastic frame member 40, bolts 42, 44, 46, 48, and a refrigerant supply system 50. An advantage of the battery system 10 is that the battery system 10 utilizes a solid thermoplastic cooling fin 32 for conducting heat energy from the first and second battery cells 34, 36 to the cooling plate 30.

Referring to FIGS. 1-4, the cooling plate 30 is configured to receive a gaseous-liquid refrigerant and to transition the gaseous-liquid refrigerant into a gaseous refrigerant utilizing the heat energy received from solid thermoplastic cooling fin 32. As a result, the cooling plate 30 cools the solid thermoplastic cooling fin 32 and the first and second battery cells 34, 36. The cooling plate 30 includes a housing 70, an inlet port 72, and an outlet port 74. The housing 70 defines an interior region 76. Both the inlet port 72 and the outlet port 74 are coupled to the housing 70 and fluidly communicate with the interior region 76. In an exemplary embodiment, the housing 70 is constructed of aluminum. Of course, in an alternative embodiment, the housing 70 could be constructed of other thermally conductive materials known to those skilled in the art. The inlet port 72 and the outlet port 74 are fluidly coupled to the refrigerant supply system 50.

Figure 3:
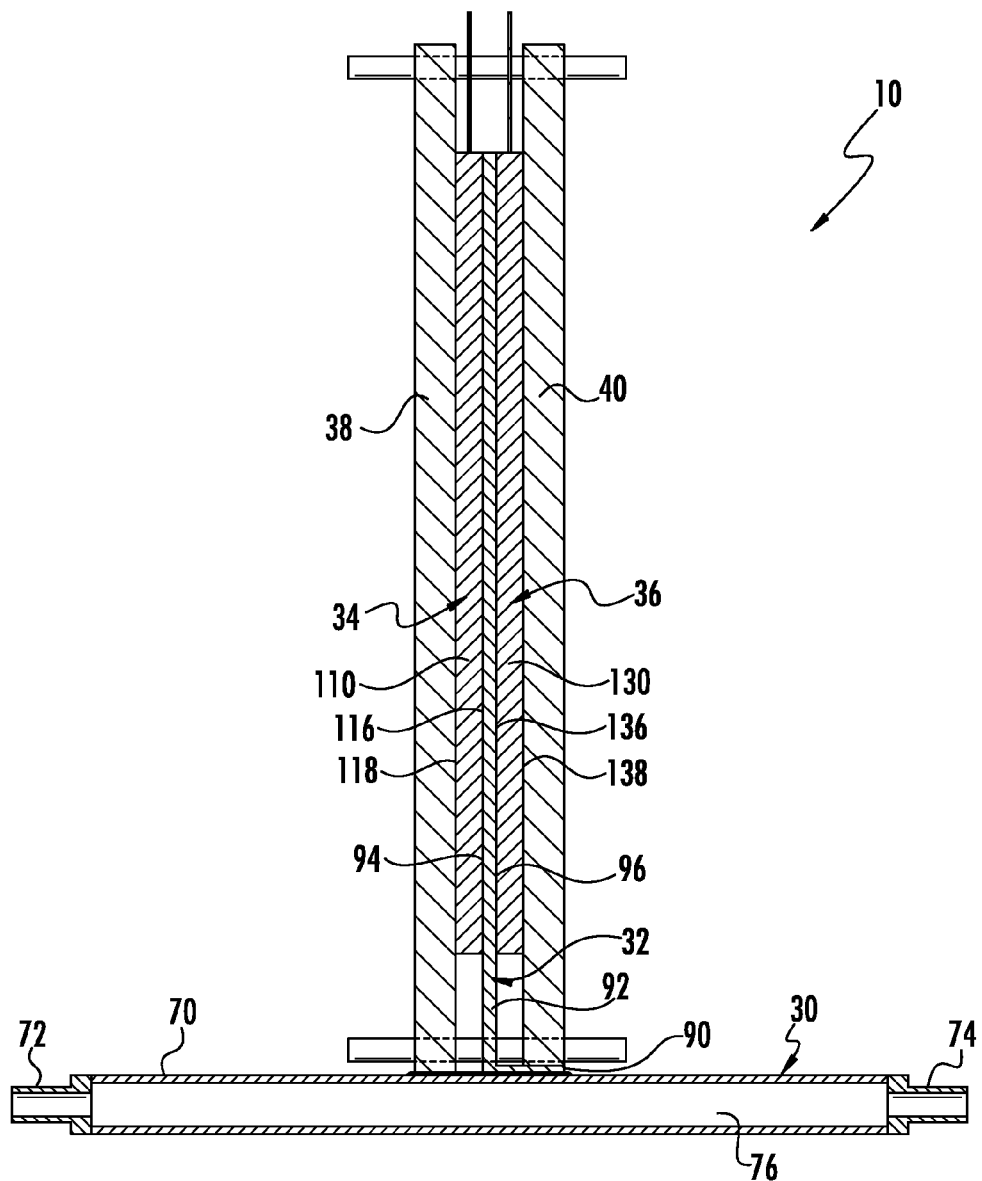
FIG. 3 is a cross-sectional schematic of a portion of the battery system of FIG. 1.
Figure 4:
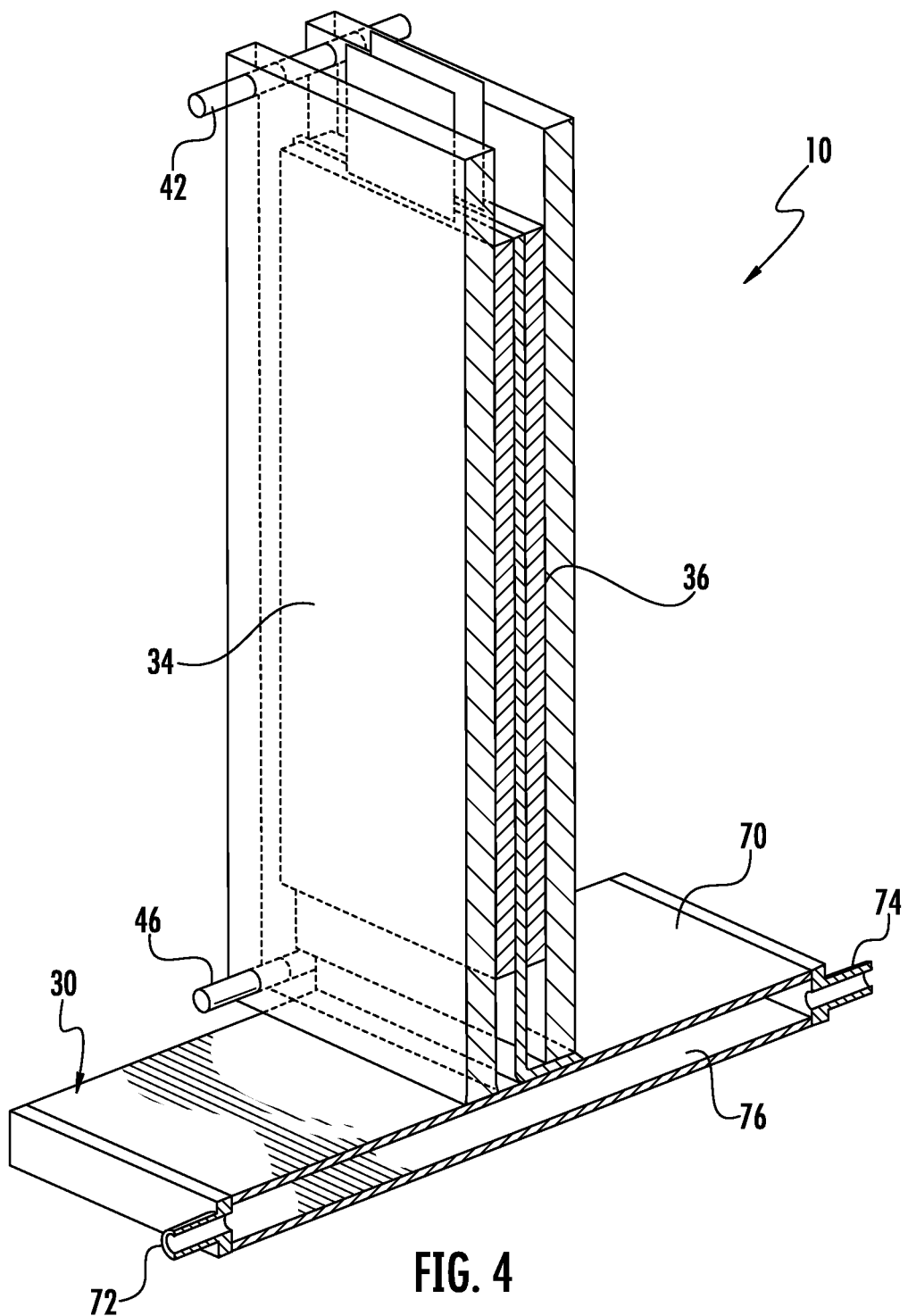
FIG. 4 is another cross-sectional schematic of a portion of the battery system of FIG. 1.
Figure 9:
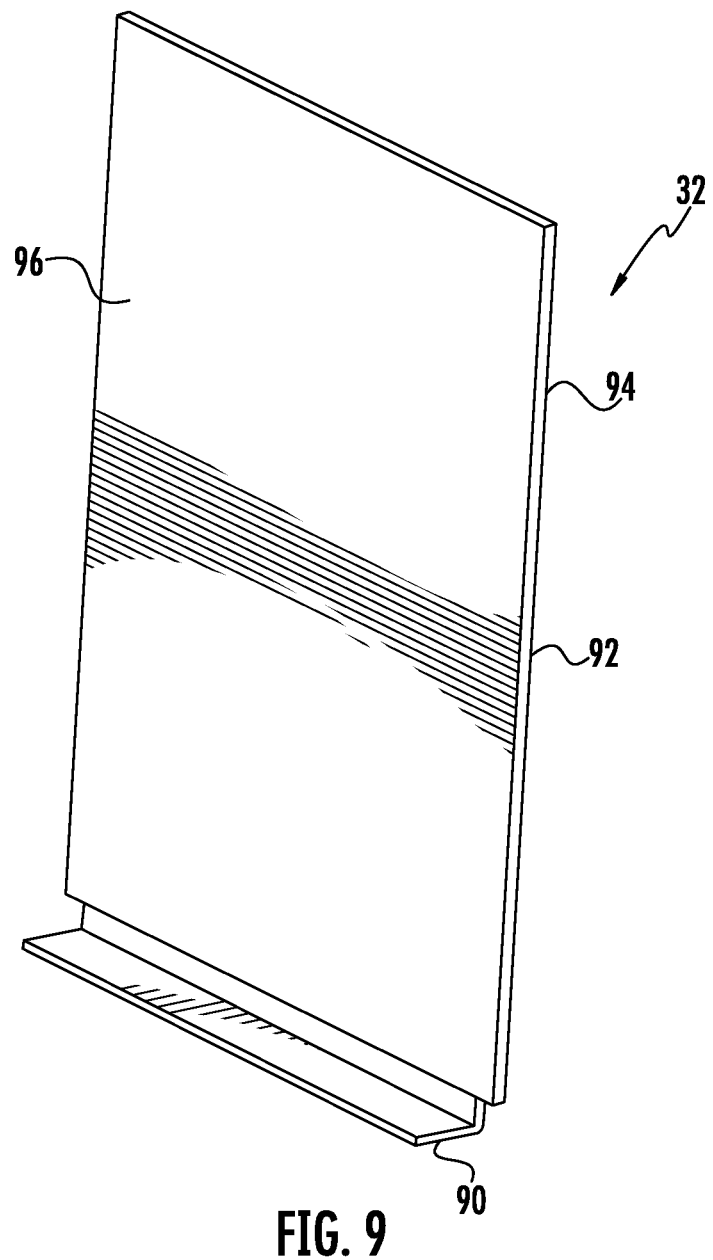
FIG. 9 is a schematic of a solid thermoplastic cooling fin utilized in the battery system of FIG. 1.

Referring to FIGS. 3, 4 and 9, the solid thermoplastic cooling fin 32 is provided to conduct heat energy from the first and second battery cells 34, 36 to the cooling plate 30 in order to cool the first and second battery cells 34, 36. The solid thermoplastic cooling fin 32 includes a first panel portion 90 coupled to an end of the second panel portion 92 that extends substantially perpendicular to the second panel portion 92. The first panel portion 90 is a substantially flat rectangular-shaped panel portion. Further, the second panel portion 92 is a substantially flat rectangular-shaped panel portion having a first side 94 and a second side 96 disposed opposite to the first side 94. The first panel portion 90 is disposed directly on and against a substantially flat surface of the cooling plate 30 such that the second panel portion 92 extends substantially perpendicular to the substantially flat surface of the cooling plate 30. In an exemplary embodiment, the solid thermoplastic cooling fin 32 has a thermal conductivity of 5 W/m-K, wherein W corresponds to Watts, m corresponds to meters, and K corresponds to Kelvin.

Figure 5:
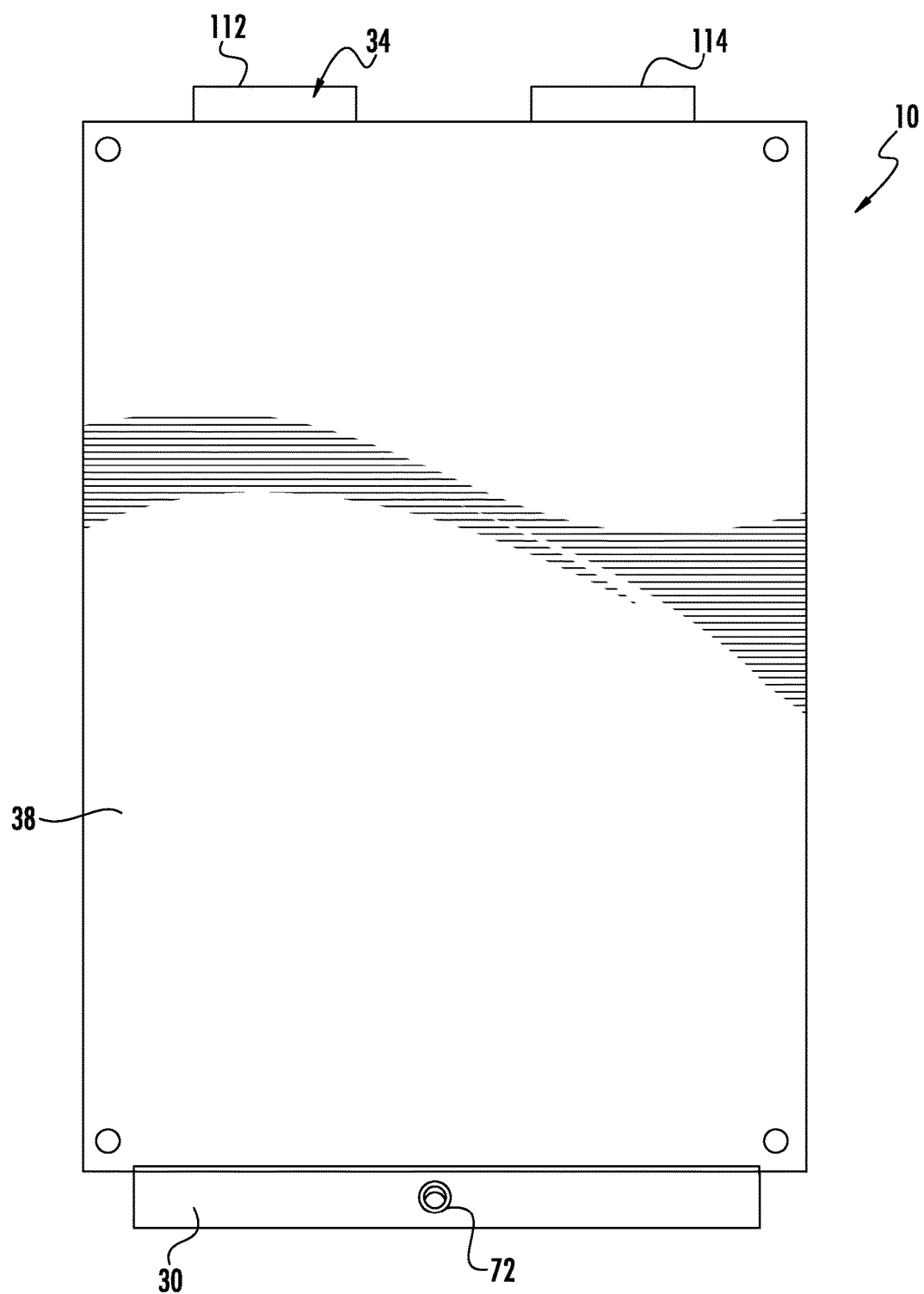
FIG. 5 is a schematic of a first side of the battery system of FIG. 1.
Figure 6:
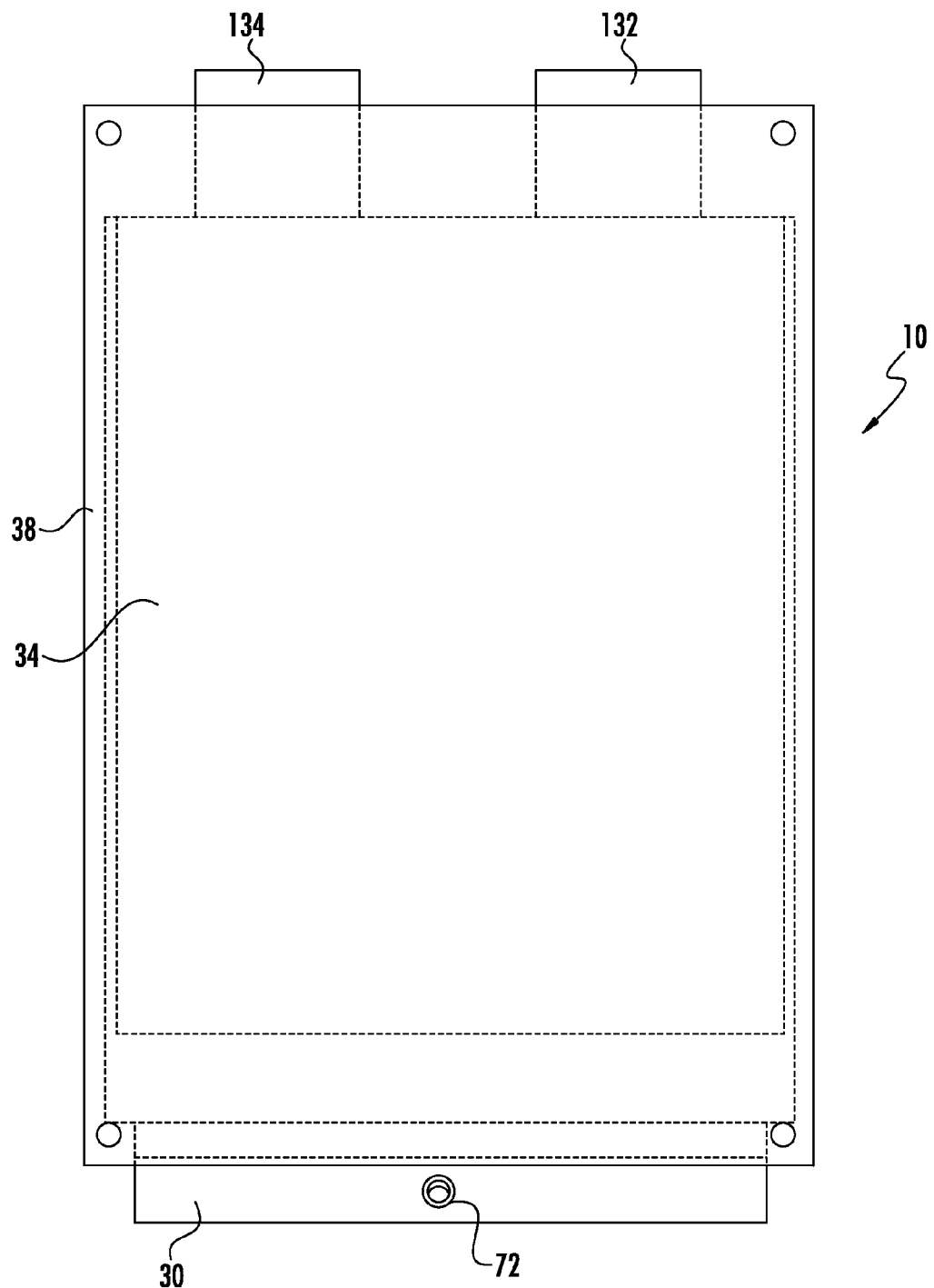
FIG. 6 is another schematic of the first side of the battery system of FIG. 1 with a plastic frame member being shown as partially transparent.

Referring to FIGS. 1, 3 and 5, the first battery cell 34 has a substantially rectangular-shaped body 110 and first and second electrical terminals 112, 114 extending from the body 110. The substantially rectangular-shaped body 110 has a first side 116 and a second side 118. The first side 116 of the first battery cell 34 is disposed directly on and against the first side 94 of the second panel portion 92 of the solid thermoplastic cooling fin 32. The first side 94 of the second panel portion 92 is sized and shaped to cover substantially all of the first side 116 of the substantially rectangular-shaped body 110. In an exemplary embodiment, the first battery cell 34 is a Lithium-ion pouch-type battery cell. Of course, in an alternative embodiment, another type of battery cell could be utilized.

Figure 7:
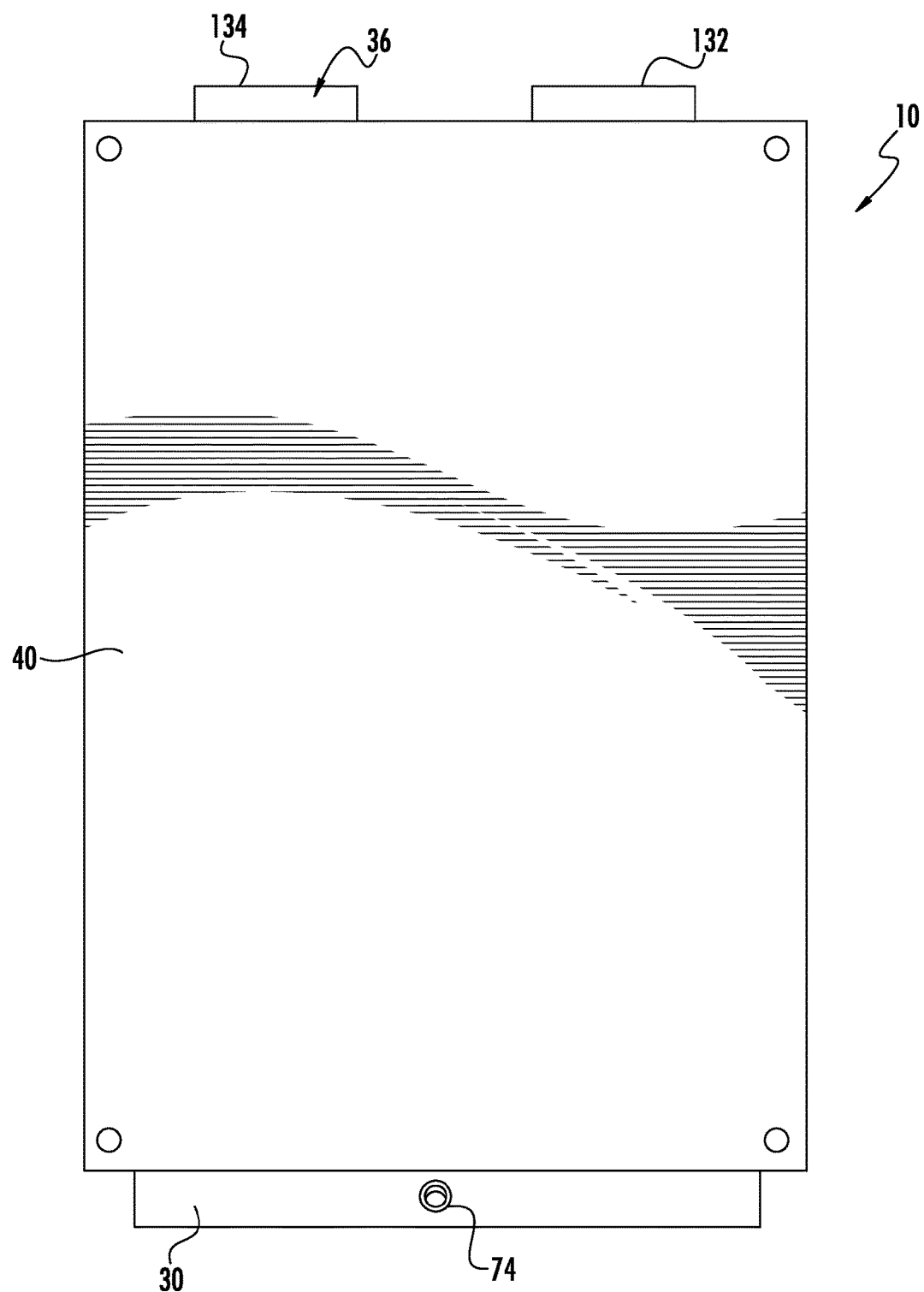
FIG. 7 is a schematic of a second side of the battery system of FIG. 1.
Figure 8:
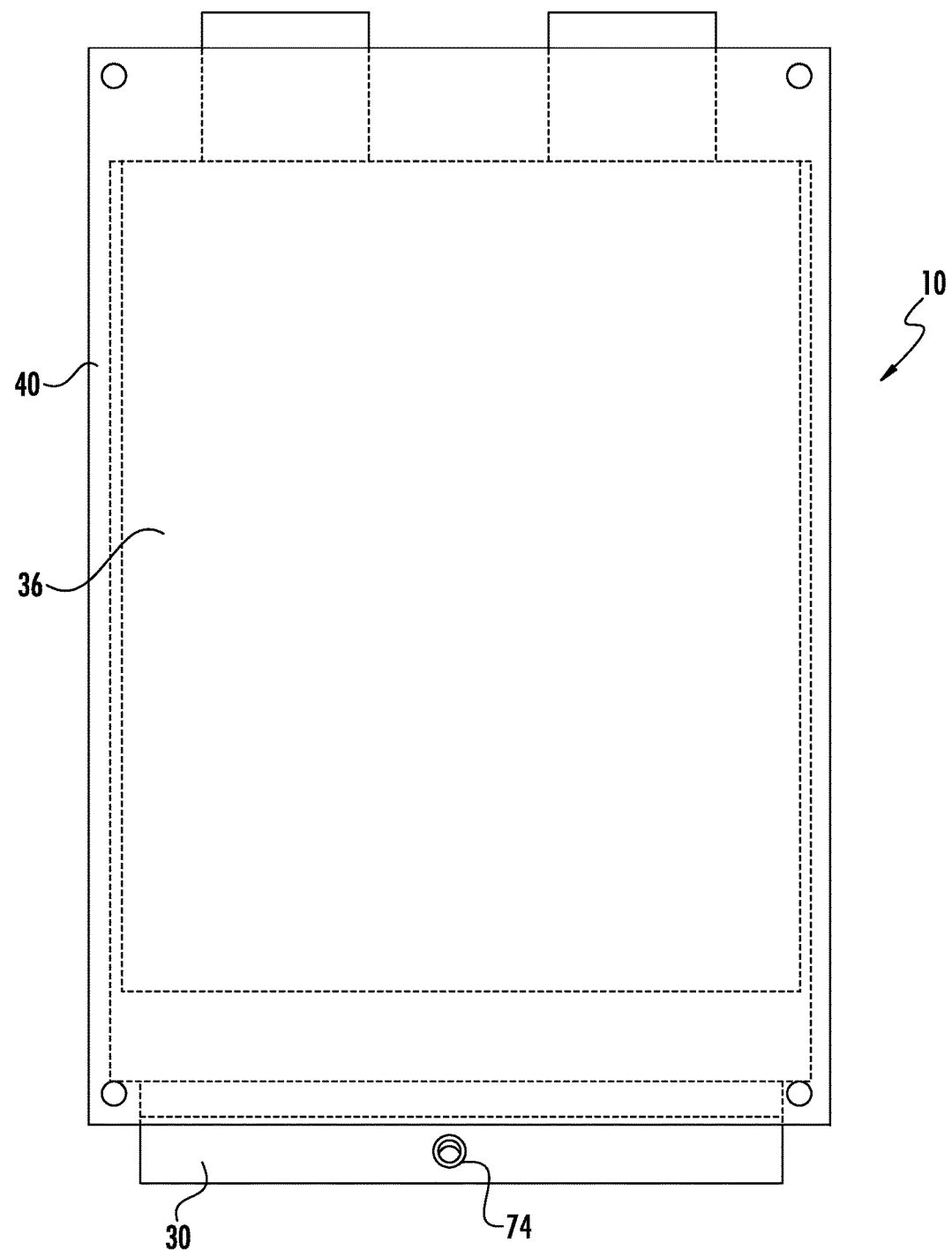
FIG. 8 is another schematic of the second side of the battery system of FIG. 1 with a plastic frame member being shown as partially transparent.

Referring to FIGS. 1, 3 and 7, the second battery cell 36 has a substantially rectangular-shaped body 130 and first and second electrical terminals 132, 134 extending from the body 130. The substantially rectangular-shaped body 130 has a first side 136 and a second side 138. The first side 136 of the second battery cell 36 is disposed directly on and against the second side 96 of the second panel portion 92 of the solid thermoplastic cooling fin 32. The second side 96 of the second panel portion 92 is sized and shaped to cover substantially all of the first side 136 of the substantially rectangular-shaped body 130. In an exemplary embodiment, the second battery cell 36 is a Lithium-ion pouch-type battery cell. Of course, in an alternative embodiment, another type of battery cell could be utilized.

Figure 2:
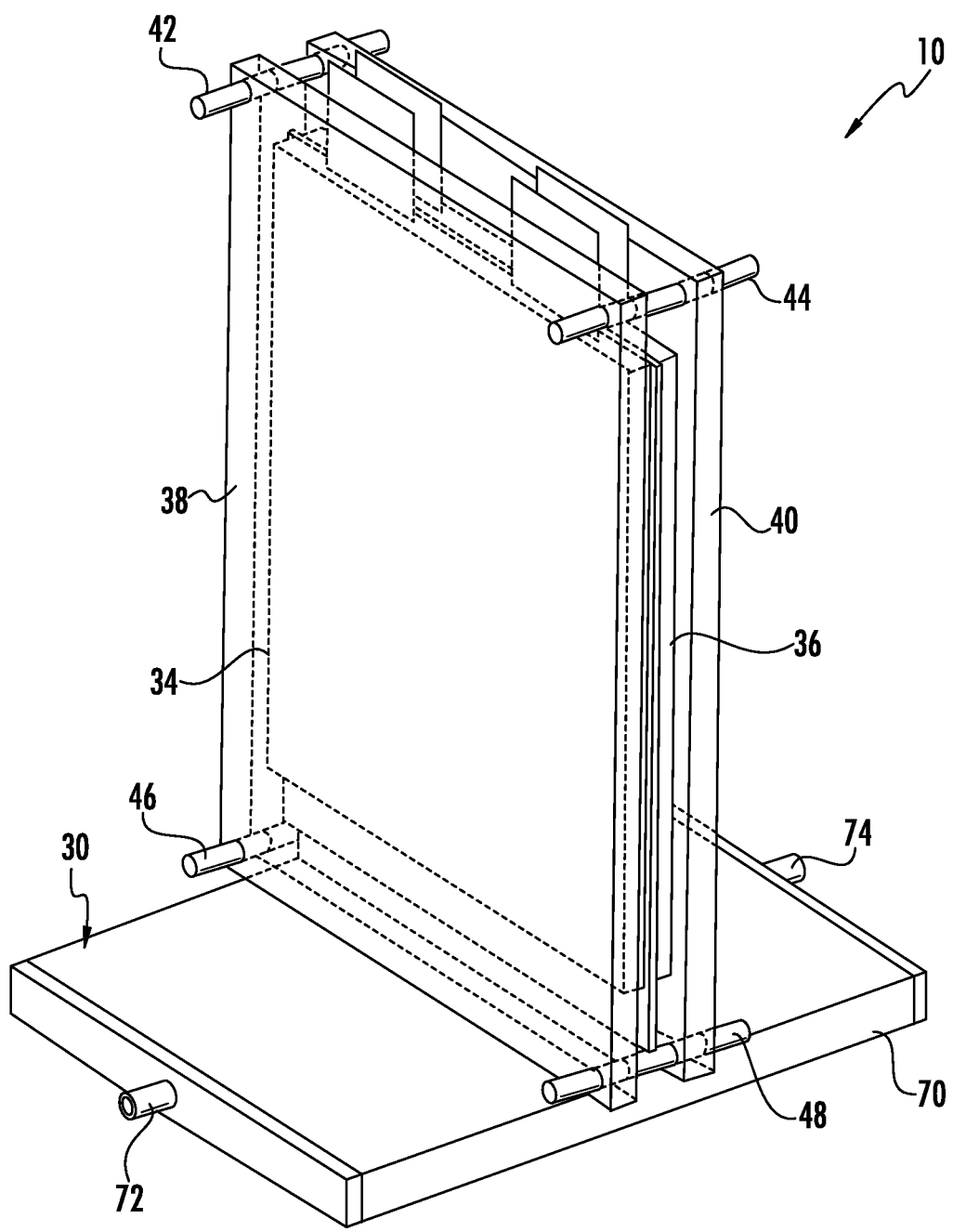
FIG. 2 is a schematic of a portion of the battery system of FIG. 1.

Referring to FIGS. 1-3, the first and second plastic frame members 38, 40 are disposed against the first and second battery cells 34, 36, respectively, such that the first and second battery cells 34, 36 and the second panel portion 92 of the solid thermoplastic cooling fin 32 are disposed between the first and second plastic frame members 38, 40.

The bolts 42, 44, 46, 48 are adapted to couple the first and second plastic frame members 38, 40 to one another. In particular, each of the bolts 42, 44, 46, 48 extend through a respective aperture in the first plastic frame member 38 and through a respective aperture in the second plastic frame member 40.

Referring to FIG. 1, the refrigerant supply system 50 is fluidly coupled to both the inlet port 72 and the outlet port 74 the cooling plate 30. The refrigerant supply system 50 is adapted to supply a refrigerant to the inlet port 72 of the cooling plate 30 such that the cooling plate 30 transfers heat energy from the solid thermoplastic cooling fin 32 to the refrigerant flowing through the cooling plate 30. The refrigerant exits the outlet port 74 and is returned to the refrigerant supply system 50.

Figure 10:
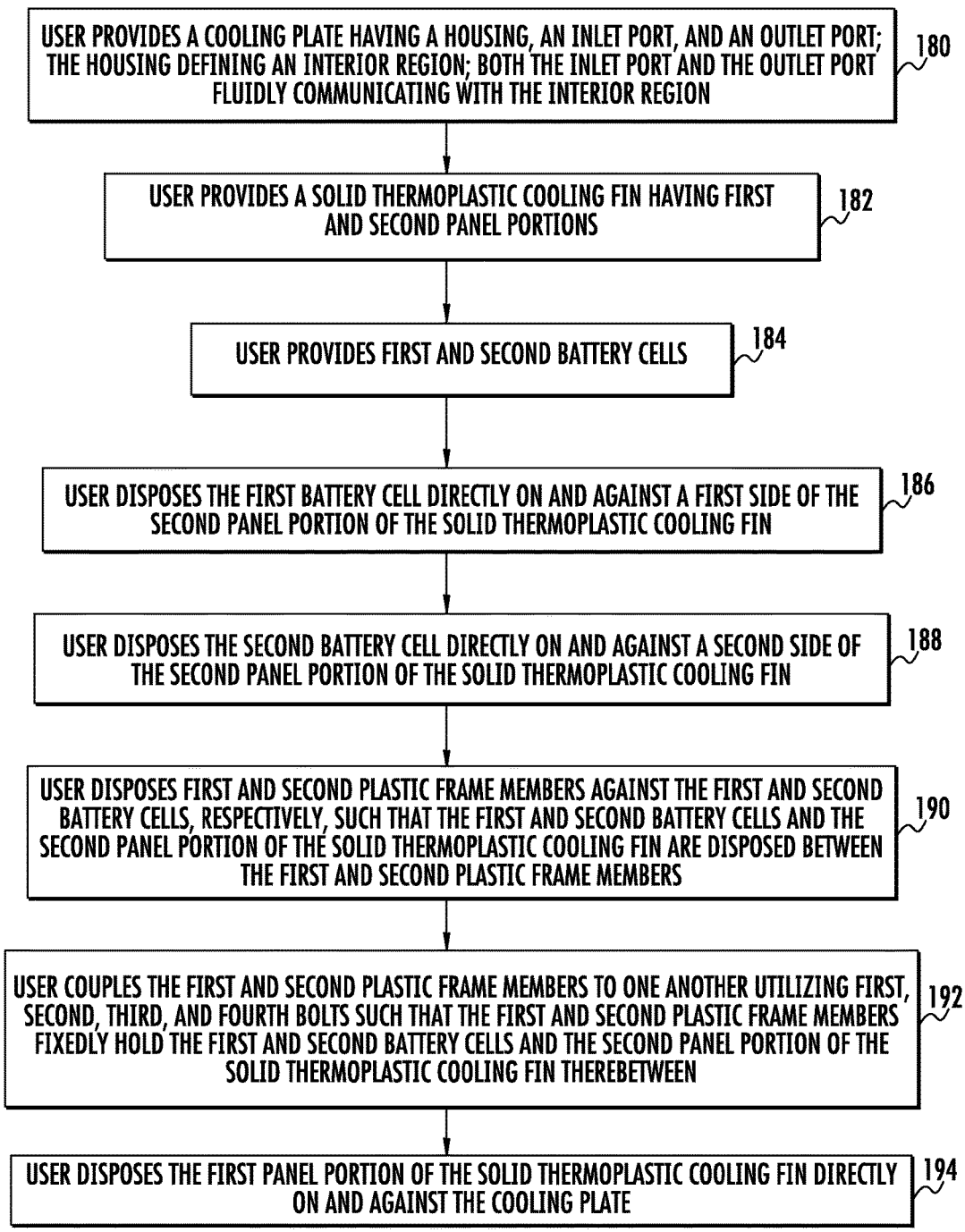
FIG. 10 is a schematic of a flowchart of assembling a portion of the battery system of FIG. 1 in accordance with another exemplary embodiment.

Referring to FIGS. 1, 3 and 10, a flowchart of a method for assembling the battery system 10 in accordance with another exemplary embodiment will now be explained.

At step 180, a user provides the cooling plate 30 having the housing 70, the inlet port 72, and the outlet port 74. The housing 70 defines the interior region 76. Both the inlet port 72 and the outlet port 74 fluidly communicate with the interior region 76. After step 180, the method advances to step 182.

At step 182, the user provides the solid thermoplastic cooling fin 32 having the first and second panel portions 90, 92. After step 182, the method advances to step 184.

At step 184, the user provides first and second battery cells 34, 36. After step 184, the method advances to step 186.

At step 186, the user disposes the first battery cell 34 directly on and against the first side 94 of the second panel portion 92 of the solid thermoplastic cooling fin 32. After step 186, the method advances to step 188.

At step 188, the user disposes the second battery cell 36 directly on and against the second side 96 of the second panel portion 92 of the solid thermoplastic cooling fin 32. After step 188, the method advances to step 190.

At step 190, the user disposes first and second plastic frame members 38, 40 against the first and second battery cells 34, 36, respectively, such that the first and second battery cells 34, 36 and the second panel portion 92 of the solid thermoplastic cooling fin 32 are disposed between the first and second plastic frame members 38, 40. After step 190, the method advances to step 192.

At step 192, the user couples the first and second plastic frame members 38, 40 to one another utilizing bolts 42, 44, 46, 48 such that the first and second plastic frame members 30, 40 fixedly hold the first and second battery cells 34, 36 and the second panel portion 92 of the solid thermoplastic cooling fin 32 therebetween. After step 192, the method advances to step 194.

At step 194, the user disposes the first panel portion 90 of the solid thermoplastic cooling fin 32 directly on and against the cooling plate 30.

The battery system and the method of assembling the battery system provide a substantial advantage over other battery systems and methods. In particular, the battery system utilizes a solid thermoplastic cooling fin for conducting heat energy from the first and second battery cells to the cooling plate which unexpectedly had sufficient thermal conductive to adequately cool the first and second battery cells.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery system, comprising:
   a cooling plate having a housing, an inlet port, and an outlet port, the housing defining an interior region, both the inlet port and the outlet port fluidly communicating with the interior region;
   a solid thermoplastic cooling fin having first and second panel portions, the second panel portion having first and second sides, the first panel portion being coupled to an end of the second panel portion, the first panel portion extending substantially perpendicular to the first and second sides of the second panel portion and past the first side of the second panel portion a first distance, the first panel portion being disposed directly on and against the cooling plate; and
   a first lithium-ion pouch-type battery cell having a rectangular-shaped pouch-type body with an outer surface being disposed directly on and against the first side of the second panel portion of the solid thermoplastic cooling fin, and a bottom end of the rectangular-shaped pouch-type body of the first lithium-ion pouch-type battery cell being disposed a second distance away from the first panel portion of the solid thermoplastic cooling fin and being further disposed a third distance away from the cooling plate, the solid thermoplastic cooling fin configured to conduct heat energy from the first lithium-ion pouch-type battery cell to the cooling plate; and
   a second lithium-ion pouch-type battery cell disposed directly on and against the second side of the second panel portion of the solid thermoplastic cooling fin, the solid thermoplastic cooling fin configured to conduct heat energy from the second lithium-ion pouch-type battery cell to the cooling plate.

2. The battery system of claim 1, wherein the first panel portion is a substantially flat rectangular-shaped panel portion, and the second panel portion is a substantially flat rectangular-shaped panel portion.

3. The battery system of claim 1, further comprising first and second plastic frame members disposed against the first and second lithium-ion pouch-type battery cells, respectively, such that the first and second lithium-ion pouch-type battery cells and the second panel portion of the solid thermoplastic cooling fin are disposed between the first and second plastic frame members.

4. The battery system of claim 3, further comprising first, second, third, and fourth bolts adapted to couple the first and second plastic frame members to one another.

5. The battery system of claim 1, wherein the first side of the second panel portion of the solid thermoplastic cooling fin being sized and shaped to cover substantially all of a first side of the outer surface of the substantially rectangular-shaped pouch-type body.

6. The battery system of claim 1, further comprising a refrigerant supply system adapted to supply a refrigerant to the inlet port of the cooling plate such that the cooling plate transfers heat energy from the solid thermoplastic cooling fin to the refrigerant flowing through the cooling plate.

7. The battery system of claim 1, wherein the solid thermoplastic cooling fin is disposed away from and does not communicate with an internal region of the rectangular-shaped pouch-type body of the first lithium-ion pouch-type battery cell.

8. The battery system of claim 1, wherein the solid thermoplastic cooling fin has a thermal conductivity of 5 Watts/meter-Kelvin.

9. A method of assembling a battery system, comprising:
providing a cooling plate having a housing, an inlet port, and an outlet port; the housing defining an interior region; both the inlet port and the outlet port fluidly communicating with the interior region;
providing a solid thermoplastic cooling fin having first and second panel portions, the second panel portion having first and second sides, the first panel portion being coupled to an end of the second panel portion, the first panel portion extending substantially perpendicular to the first and second sides of the second panel portion and past the first side of the second panel portion a first distance;
providing a first lithium-ion pouch-type battery cell having a rectangular-shaped pouch-type body with an outer surface;
providing a second lithium-ion pouch-type battery cell having a rectangular-shaped pouch-type body with an outer surface;
disposing the first panel portion of the solid thermoplastic cooling fin directly on and against the cooling plate;
disposing the outer surface of the rectangular-shaped pouch-type body of the first lithium-ion pouch-type battery cell directly on and against the first side of the second panel portion of the solid thermoplastic cooling fin, such that a bottom end of the rectangular-shaped pouch-type body of the first lithium-ion pouch-type battery cell being disposed a second distance away from the first panel portion of the solid thermoplastic cooling fin and being further disposed a third distance away from the cooling plate; and
disposing the outer surface of the rectangular-shaped pouch-type body of the second lithium-ion pouch-type battery cell directly on and against the second side of the second panel portion of the solid thermoplastic cooling fin such that a bottom end of the rectangular-shaped pouch-type body of the second lithium-ion pouch-type battery cell being disposed the second distance away from the first panel portion of the solid thermoplastic cooling fin and being further disposed the third distance away from the cooling plate.

10. The method of claim 9, further comprising disposing first and second plastic frame members against the first and second lithium-ion pouch-type battery cells such that the first and second lithium-ion pouch-type battery cells and the second panel portion of the solid thermoplastic cooling fin are disposed between the first and second plastic frame members.

11. The method of claim 10, further comprising coupling the first and second plastic frame members to one another utilizing first, second, third, and fourth bolts.

12. The method of claim 9, wherein the solid thermoplastic cooling fin is disposed away from and does not communicate with an internal region of the rectangular-shaped pouch-type body of the first lithium-ion pouch-type battery cell.

13. The battery system of claim 9, wherein the solid thermoplastic cooling fin has a thermal conductivity of 5 Watts/meter-Kelvin.

* * * * *